US008233025B2

(12) United States Patent
Lee et al.

(10) Patent No.: US 8,233,025 B2
(45) Date of Patent: Jul. 31, 2012

(54) MOBILE TERMINAL AND METHOD FOR CONTROLLING VIDEO CALL THEREOF

(75) Inventors: Hyun-Suk Lee, Seoul (KR); An-Na Choi, Gyeonggi-Do (KR); Jin-Ho Son, Seoul (KR); Sun-Ju Lee, Seoul (KR); Jae-Do Kwak, Seoul (KR); Jong-Keun Youn, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 883 days.

(21) Appl. No.: 12/341,285

(22) Filed: Dec. 22, 2008

(65) Prior Publication Data

US 2009/0273659 A1    Nov. 5, 2009

(30) Foreign Application Priority Data

Apr. 30, 2008  (KR) .................. 10-2008-0040550

(51) Int. Cl.
*H04N 7/14* (2006.01)
(52) U.S. Cl. ............. 348/14.02; 348/14.01; 455/550.01; 704/246
(58) Field of Classification Search .... 348/14.01–14.16; 704/246; 455/550.01
See application file for complete search history.

(56) References Cited

U.S. PATENT DOCUMENTS

| 6,493,020 B1 | 12/2002 | Stevenson et al. |
| 2005/0207554 A1* | 9/2005 | Ortel ......................... 379/202.01 |
| 2009/0220065 A1* | 9/2009 | Ahuja et al. ............. 379/202.01 |

FOREIGN PATENT DOCUMENTS

WO   WO 2007/052100 A2   5/2007

* cited by examiner

*Primary Examiner* — Melur Ramakrishnaiah
(74) *Attorney, Agent, or Firm* — Birch, Stewart, Kolasch & Birch, LLP

(57) ABSTRACT

A mobile terminal including an input unit configured to receive an instruction from a first user to perform a video call communication with at least a second user, a display unit, a voice recognition module configured to recognize input voice statements conducted during the video call communication between the first and second users, and a controller configured to perform the video call communication between the first and second users based on the instruction from the first user, to control the display unit to display images of the first and second users, to detect a voice statement from the first user designating the second user by examining the voice statements recognized by the voice recognition module, and to emphatically display the image of the second user compared with the image of the first user based on the detected voice statement from the first user.

26 Claims, 14 Drawing Sheets

MOBILE TERMINAL AND METHOD FOR CONTROLLING VIDEO CALL THEREOF

CROSS REFERENCE TO RELATED APPLICATIONS

The present application claims priority to Korean Application No. 10-2008-0040550 filed in Korea on Apr. 30, 2008, the entire contents of which is hereby incorporated by reference in its entirety.

BACKGROUND OF THE INVENTION

1. Field of the Invention

The present invention relates to a mobile terminal and corresponding method for emphatically displaying an image of another party according to a user voice instruction and allowing particular functions to be performed with respect to the designated party.

2. Description of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc Users can also conduct video calls with other users.

However, when the user operates their mobile terminal to perform a video call with one participant or multiple participants (e.g., a conference call), the user interface (UI) and screen of the mobile terminal does not allow the user to select and graphically emphasize a desired participant among all the participants, and does not conveniently allow particular functions to be performed with respect to the desired participant.

SUMMARY OF THE INVENTION

Accordingly, one object of the present invention is to address the above-noted and other problems.

Another object of the present invention is to provide a mobile terminal and corresponding method for emphatically displaying an image of a designated party according to a user's voice instruction.

Still another object of the present invention is to provide a mobile terminal and corresponding method for designating another party according to a user's voice instruction during video call communication, and performing a particular function with respect to the designated party.

Yet another object of the present invention is to provide a mobile terminal and corresponding method for detecting a voice instruction of a user by using a name designating an input other party during video call communication.

To achieve these and other advantages and in accordance with the purpose of the present invention, as embodied and broadly described herein, the present invention provides in one aspect a mobile terminal including an input unit configured to receive an instruction from a first user to perform a video call communication with at least a second user, a display unit, a voice recognition module configured to recognize input voice statements conducted during the video call communication between the first and second users, and a controller configured to perform the video call communication between the first and second users based on the instruction from the first user, to control the display unit to display images of the first and second users, to detect a voice statement from the first user designating the second user by examining the voice statements recognized by the voice recognition module, and to emphatically display the image of the second user compared with the image of the first user based on the detected voice statement from the first user.

In another aspect, the present invention provides a method of controlling a mobile terminal, and which includes receiving an instruction from a first user to perform a video call communication with at least a second user, recognizing input voice statements conducted during the video call communication between the first and second users, performing the video call communication between the first and second users based on the instruction from the first user, displaying images of the first and second users, detecting a voice statement from the first user designating the second user by examining the voice statements recognized by the voice recognition module, and emphatically displaying the image of the second user compared with the image of the first user based on the detected voice statement from the first user.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1:
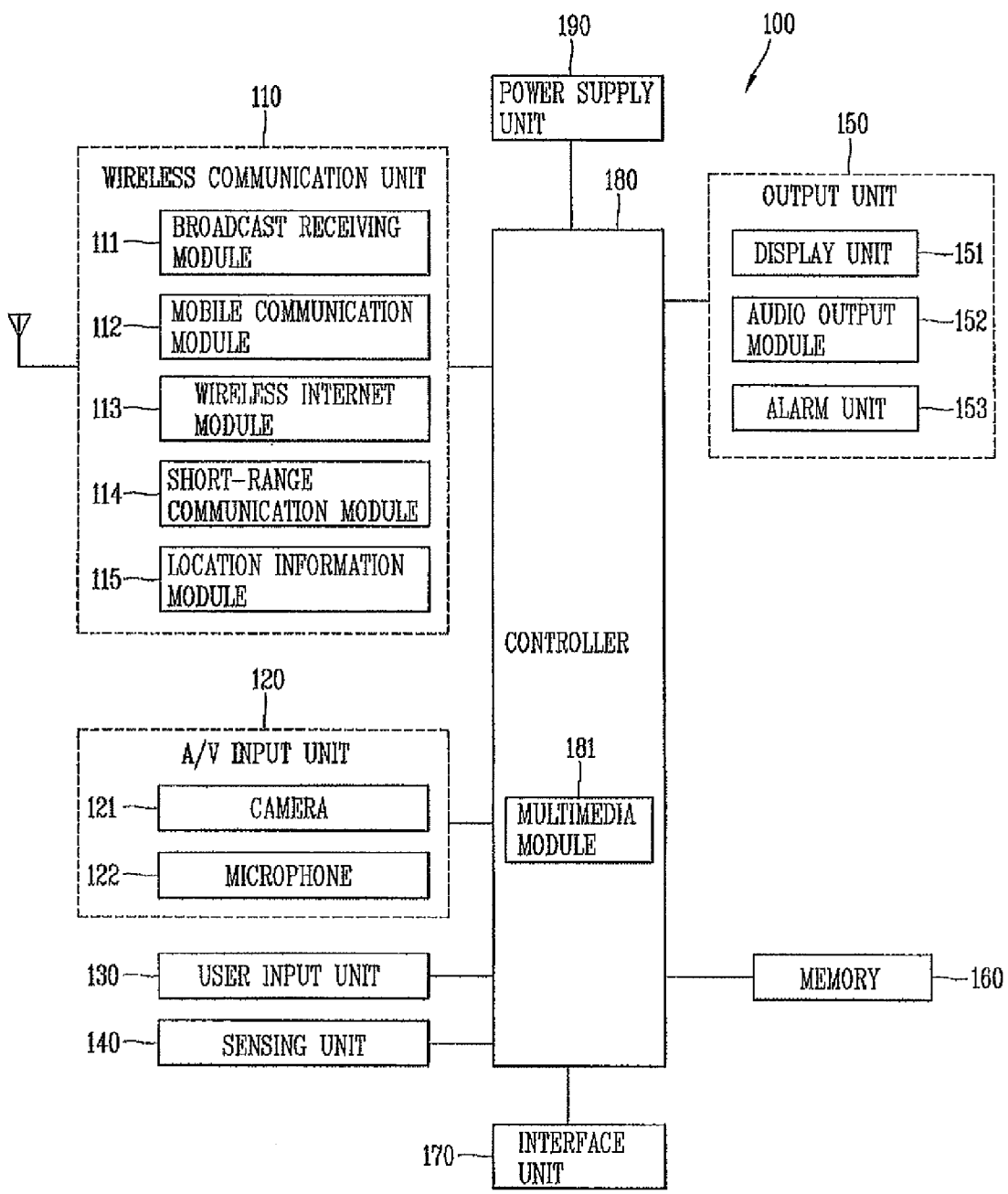
FIG. 1 is a schematic block diagram of a mobile terminal according to an embodiment of the present invention.

Reference will now be made in detail to some exemplary embodiments of the present invention, examples of which are illustrated in the accompanying drawings. In describing the present invention with reference to the accompanying drawings, the same reference numerals are used for elements performing the same or similar functions.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc.

In addition, the broadcast signal may be implemented as a TV broadcast signal, a radio broadcast signal, and a data broadcast signal, among others. The broadcast signal may further include a broadcast signal combined with a TV or radio broadcast signal. Also, the broadcast associated information may be provided via a mobile communication network (e.g., that operates according to standards such as 3GPP, 3GPP2, IEEE, CDMA, GSM, OMA, 4G techniques, etc.), and the broadcast associated information may be received by the mobile communication module 112. The broadcast signal may also exist in various forms. For example, the broadcast signal may exist in the form of an electronic program guide (EPG) of the digital multimedia broadcasting (DMB) system, an electronic service guide (ESG) of the digital video broadcast-handheld (DVB-H) system, and the like.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., access point, base station, Node-B), an external entity (e.g., other user devices) and a server or other network entity. Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof. For example, the GPS module may measure an accurate time and distance from three or more satellites, and accurately calculate a current location of the mobile terminal according to trigonometry based on the three different distances. A method of acquiring distance and time information from three satellites and performing error correction with a single satellite may also be used. In particular, the GPS module may acquire an accurate time together with three-dimensional speed information as well as the location of the latitude, longitude and altitude values from the location information received from the satellites.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The interface unit 170 may be used as a communication link (or passage, path, etc.) through which the terminal can exchange data or the like with an external device. For example, the interface unit 170 may be implemented in the form of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the mobile terminal, or the like.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The display unit 151 may output information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). In addition, when the mobile terminal 100 is in a video call mode or image capturing mode, the display unit 151 may display a captured image and/or received image, a UI or GUI that shows videos or images and functions related thereto, and the like.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component. In addition, a power supply 190 provides power used by the various components for the portable device. The provided power may be internal power, external power, or combinations thereof.

Figure 2:
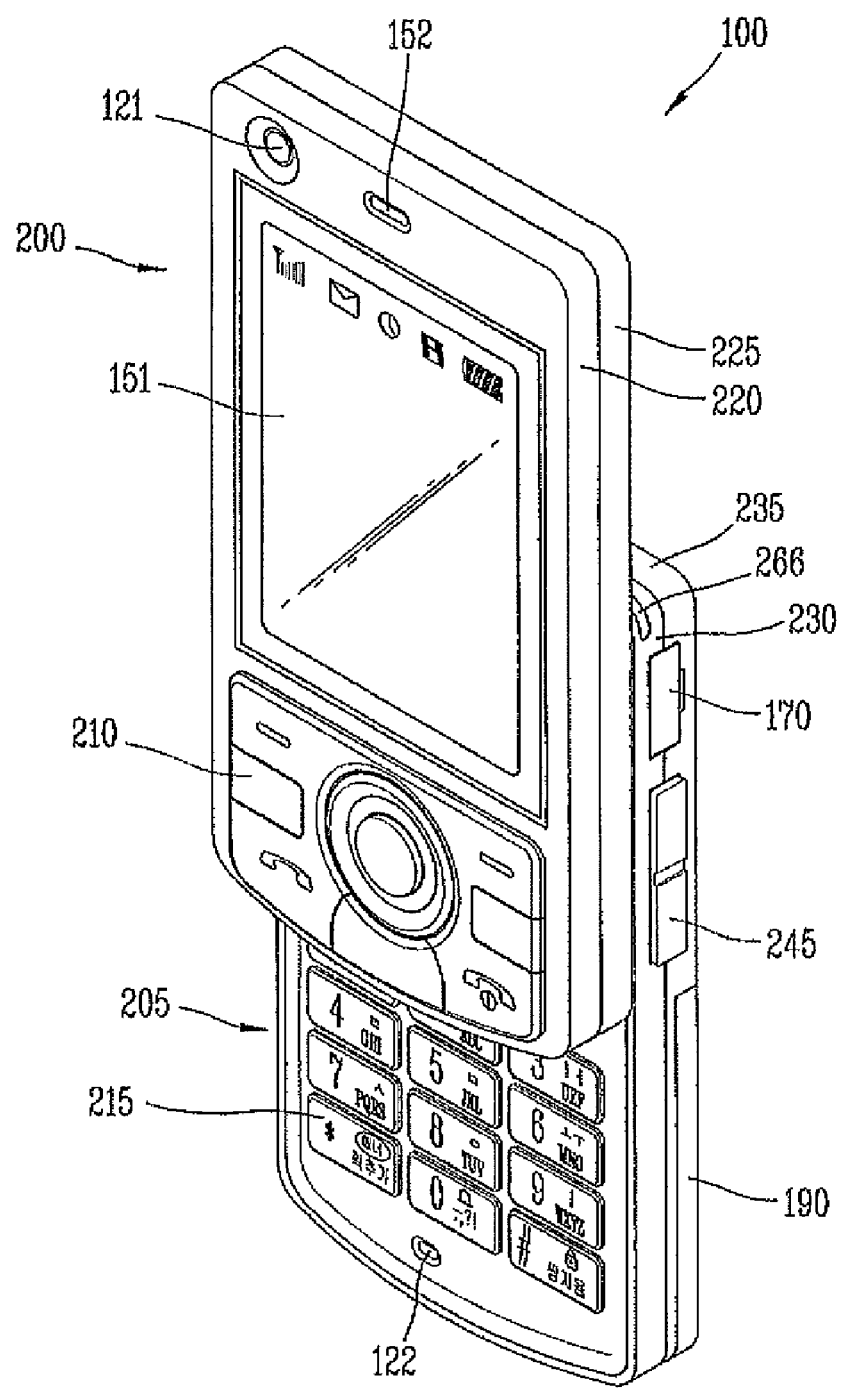
FIG. 2 is a front perspective view of the mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
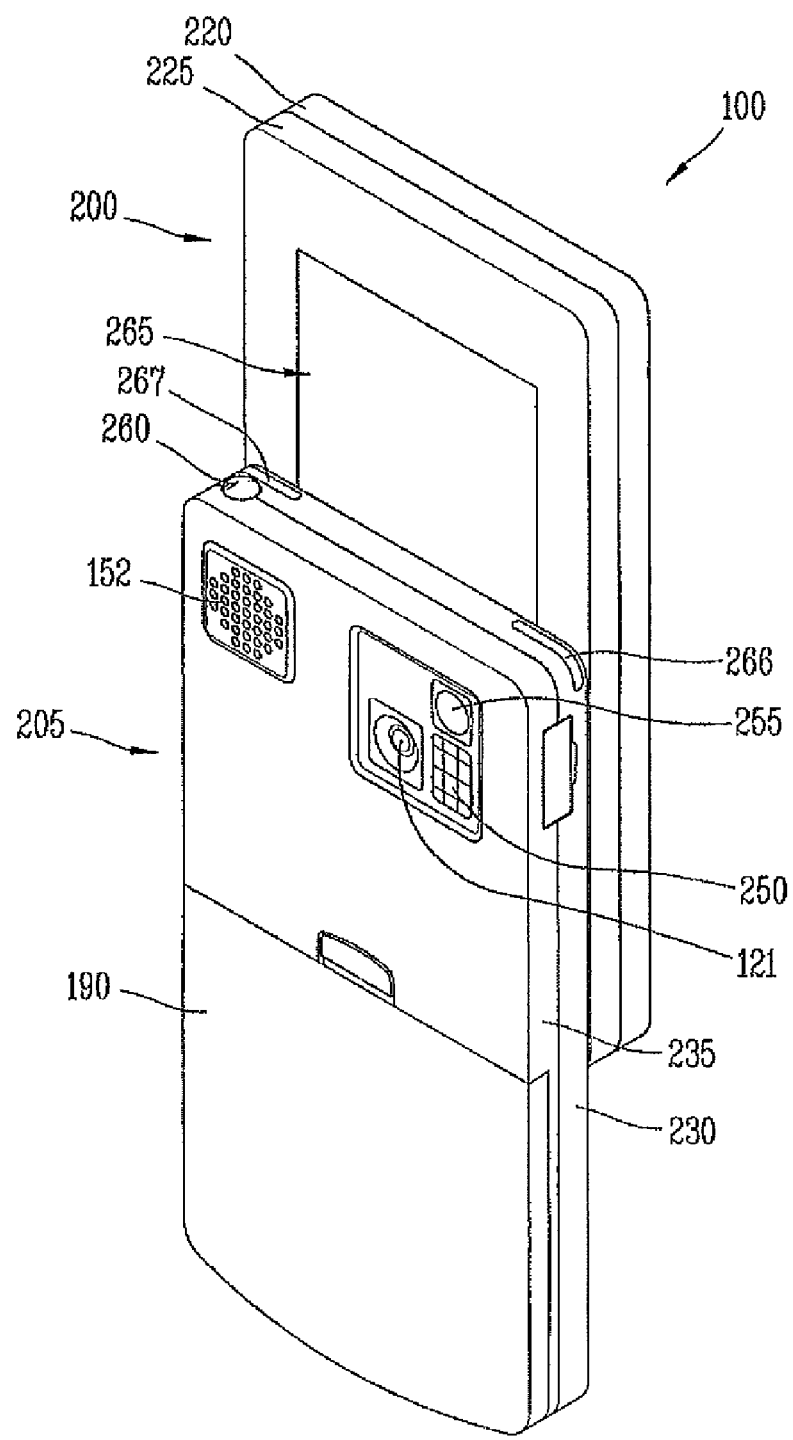
FIG. 3 is a rear perspective view of the mobile terminal in FIG. 2.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
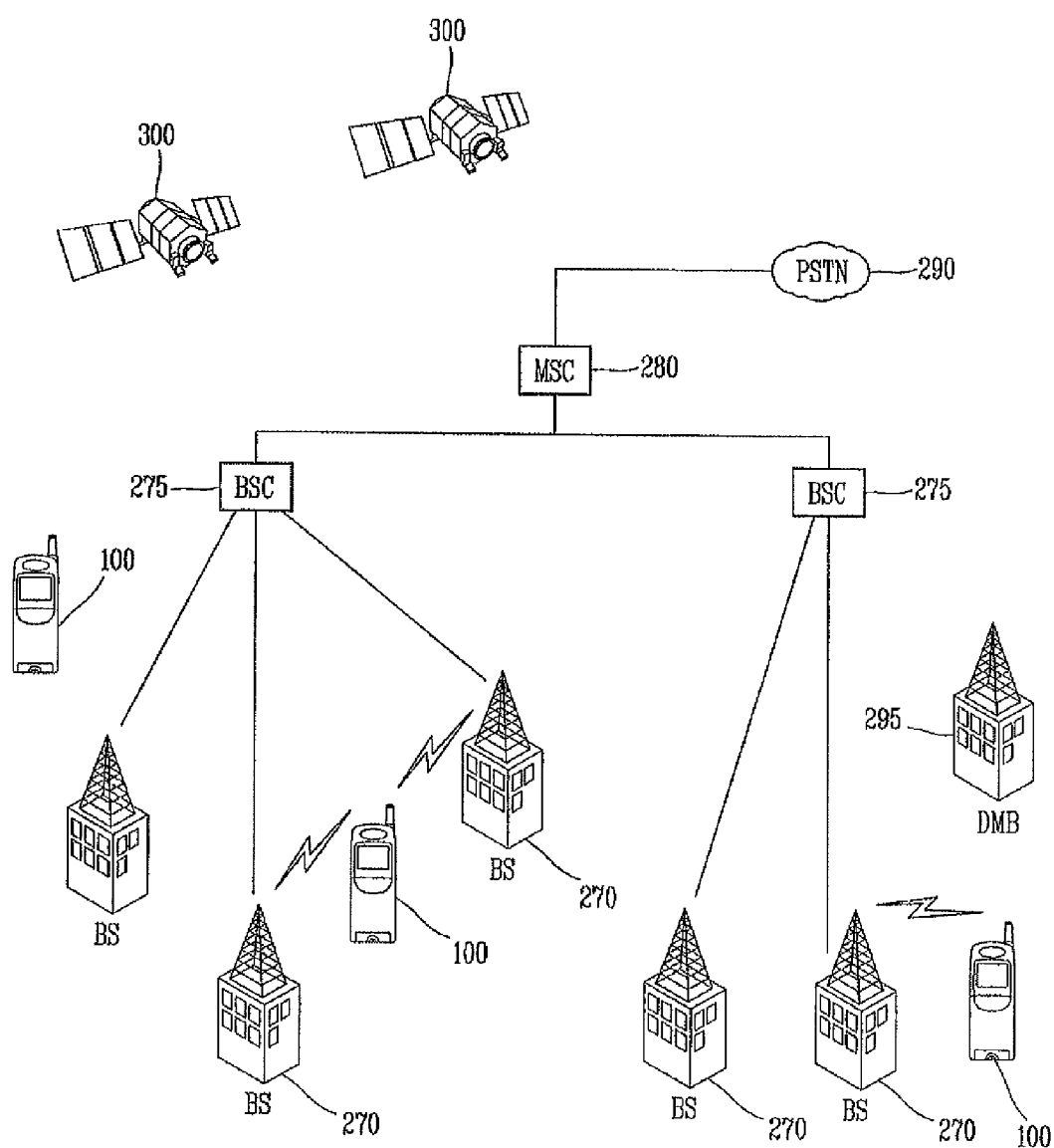
FIG. 4 is a block diagram of a wireless communication system operable with the mobile terminal according to an embodiment of the present invention.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications. In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

The mobile terminal also includes a voice recognition module configured to recognize input voice statements conducted during the video call communication between the first and second users. The controller 180 then performs a video call communication between first and second users based on the instruction from the first user, controls the display unit 151 to display images of the first and second users, detects a voice statement from the first user designating the second user by examining the voice statements recognized by the voice recognition module, and emphatically displays the image of the second user compared with the image of the first user based on the detected voice statement from the first user.

In more detail, in the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

Figure 5:
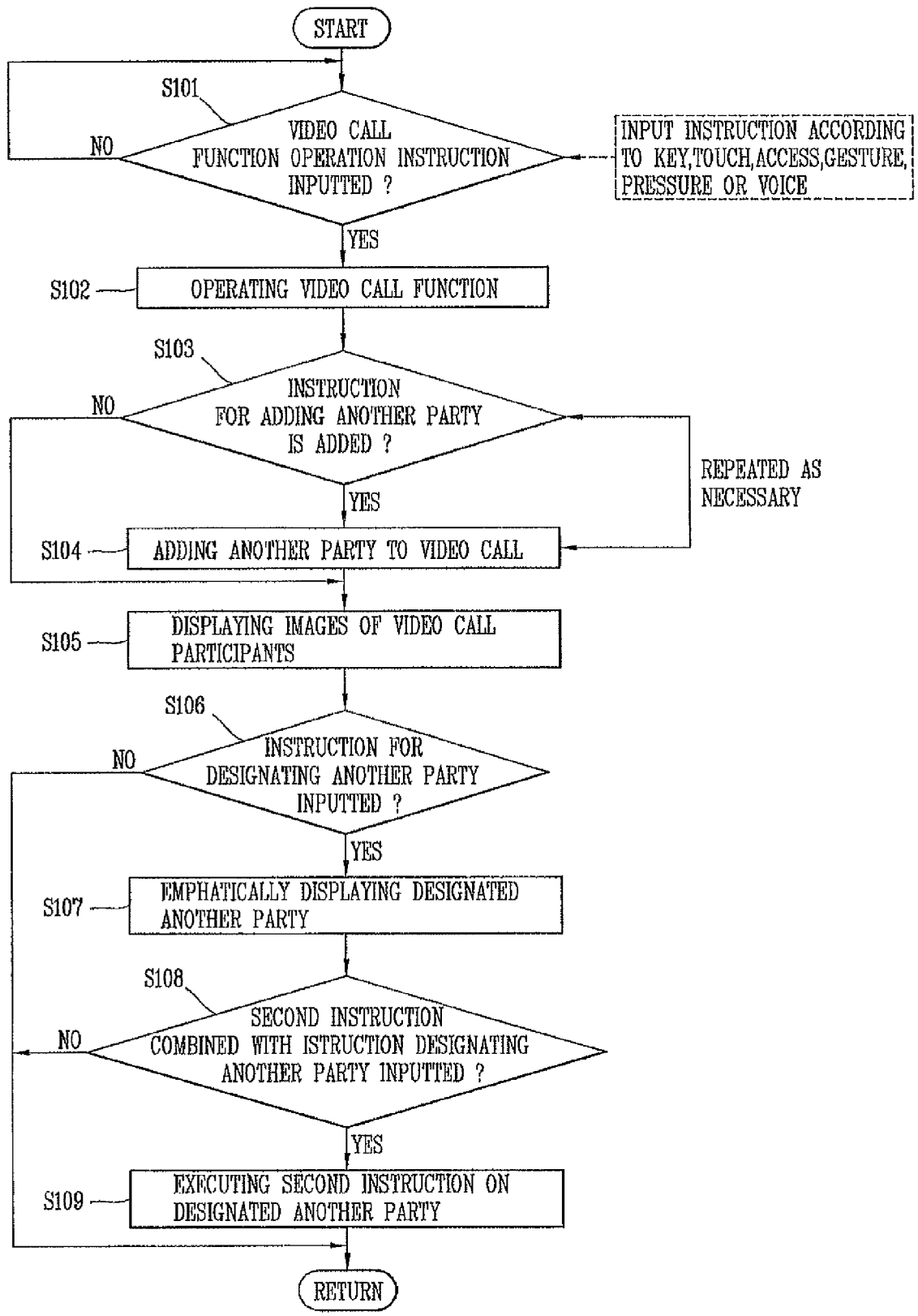
FIG. 5 is a flow chart illustrating a method for controlling a video call of the mobile terminal according to an embodiment of the present invention.

Next, FIG. 5 is a flow chart illustrating a method for controlling a video call of a mobile terminal according to an embodiment of the present invention. FIG. 1 will also be referred to throughout the description of the present invention.

As shown in FIG. 5, the controller 180 determines if the user inputs or requests a video call operation (S101) and executes the video call operation when the user inputs requests the video call operation (S102). The controller 180 also determines if the user request another party be added to the video call operation (S103). When the user does request another party be added (Yes in S103), the controller 180 adds the other party to the video call operation (S104). The other party may also be added before the video call operation or during video call communication.

The controller 180 also displays the added other party on the display unit 151 of the terminal (S105). Further, the controller 180 can display the actual image of the other party or can display a designated substitute image or a substitute video instead of the actual image of the other party. A similar concept applies to displaying the image of the calling user. In addition, text type information of the parties may be additionally displayed on the respective Images. Further, the information of the other party may be automatically displayed using information registered in a phone book, or may be displayed by using information arbitrarily input by the user.

The controller 180 then determines if the user inputs an instruction or name designating the other party be emphasized during the video call operation (S106). When the user does designate the other party (Yes in S106), the controller 180 emphatically displays the image of the designated another party, compared with an image of the user or other undesignated party, according to a pre-set environment setting option (S107).

Next, the controller 180 determines if the user inputs a second instruction in addition to designating the other party (S108). When the user inputs the second instruction (Yes in S108), the controller 180 executes the second instruction with respect to the designated other party (S109). For example, when a second instruction for transmitting contents or a message during a video call is input, the controller 180 performs the requested operation with respect to the other party.

Further, the instructions input by the user may be input using a key, a touch, an access, a gesture, press or a voice input, for example. Hereinafter, the above-described instruction input method is applicable in all embodiments to be described, but for the sake of brevity, the voice instruction input method will be described. In addition, to perform the video call function by a voice instruction, the controller 180 activates a voice recognition module or function included in a voice recognition module. Further, the voice recognition module generally includes a software program that is used to recognize voice statements made by a user. The voice recognition module can be implemented within the controller 180 or may be a separate module.

Further, if the voice recognition function is continuously maintained in an activated state, the resource consumption and power consumption of the terminal is increased. Thus, the controller 180 advantageously controls the starting and termination of the activation of the voice recognition function to reduce the resource consumption and power consumption of the mobile terminal.

Figure 6:
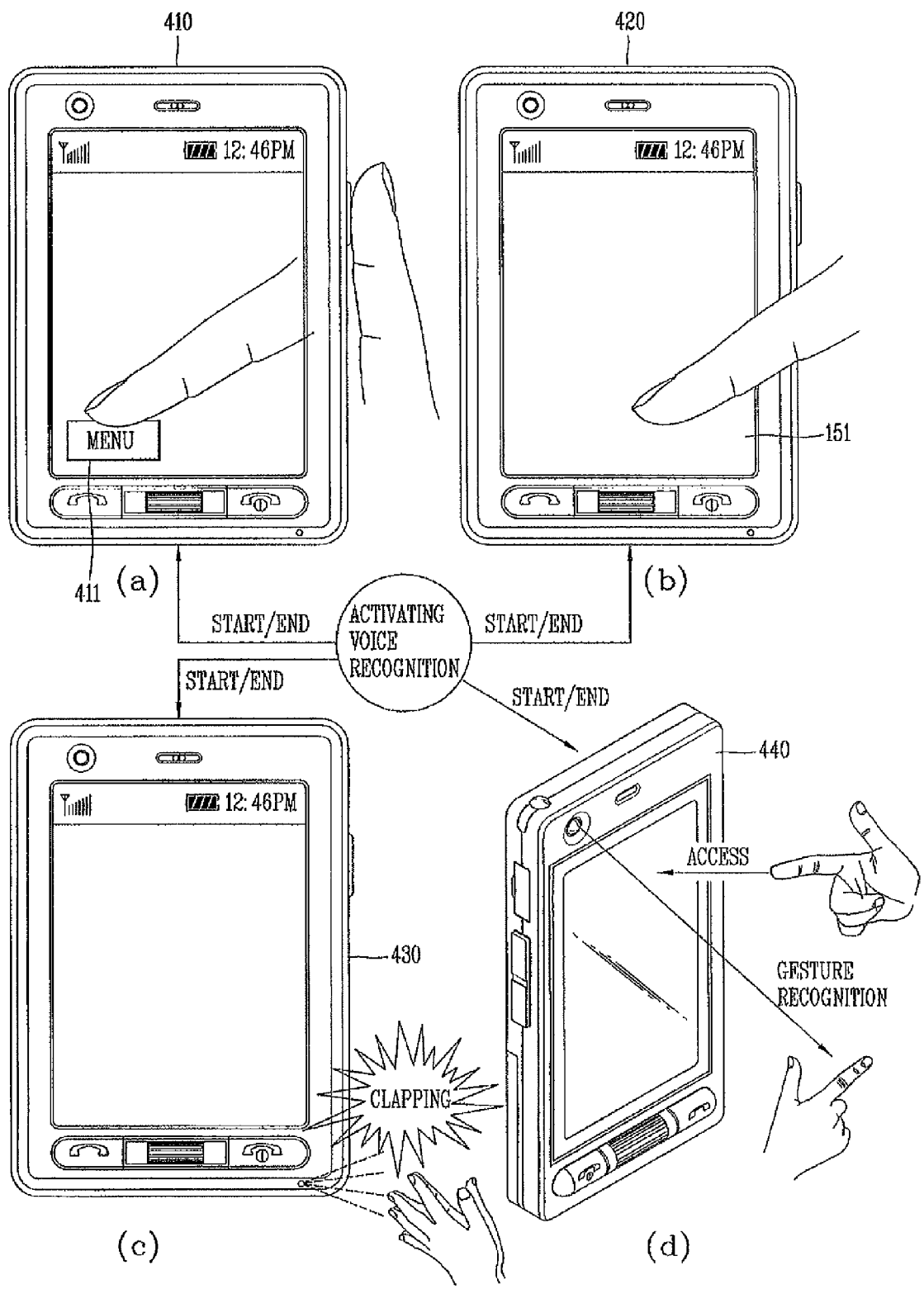
FIGS. 6(a)-(d) are overviews of display screens illustrating activating a voice recognition function on the mobile terminal according to an embodiment of the present invention.

In more detail, FIGS. 6(*a*)-(*d*) are overviews of display screens illustrating activating a voice recognition function on the mobile terminal according to an embodiment of the present invention. As shown in the display screen 410 in FIG. 6(*a*), the user can activate the voice activation function by touching or selecting a menu key or soft touch menu button 411, and then select a sub menu corresponding to the voice activation function. The voice activation function can also be immediately activated when the touch button 411 is touched. Further, the button 411 can be a hardware key, a soft key, an icon, jog dial, hot key, etc.

Further, as shown in the display screen 420 in FIG. 6(*b*), the user can also activate the voice recognition function by touching an arbitrary position or region of the display unit 151 (i.e., a region where a button or a menu icon is not displayed). The controller 180 then activates the voice recognition function. FIG. 6(*c*) illustrates a display screen 430 for an alternative embodiment in which the user activates the voice recognition function by inputting a sound or a special sound effect of a particular level. The controller 180 then activates the voice recognition function.

For example, the controller 180 can drive the voice recognition function using two types of modes: a first mode in which a sound of a particular level or higher is simply detected; and a second mode in which a voice instruction is recognized and its meaning is determined. In addition, the first mode in which resource consumption or power consumption of the terminal is small is first activated, and if a sound of a particular level or higher is input in the first mode, the second mode is activated to recognize the voice instruction.

FIG. 6(*d*) illustrates a display 440 for yet another embodiment of activating the voice recognition function. In this embodiment, the controller 180 activates the voice recognition function by detecting or sensing a local or remote radio signal or body movement information such as hand signals or a gesture of the user via the camera. That is, the mobile terminal includes a motion sensing unit configured to detect motion or a hand gesture occurring with respect to the terminal. The sensing unit 140 is an example of such a motion sensing unit. The camera may be used together with the motion sensing unit (e.g., a software program) to detect the motion and hand gestures, for example.

Figure 7:
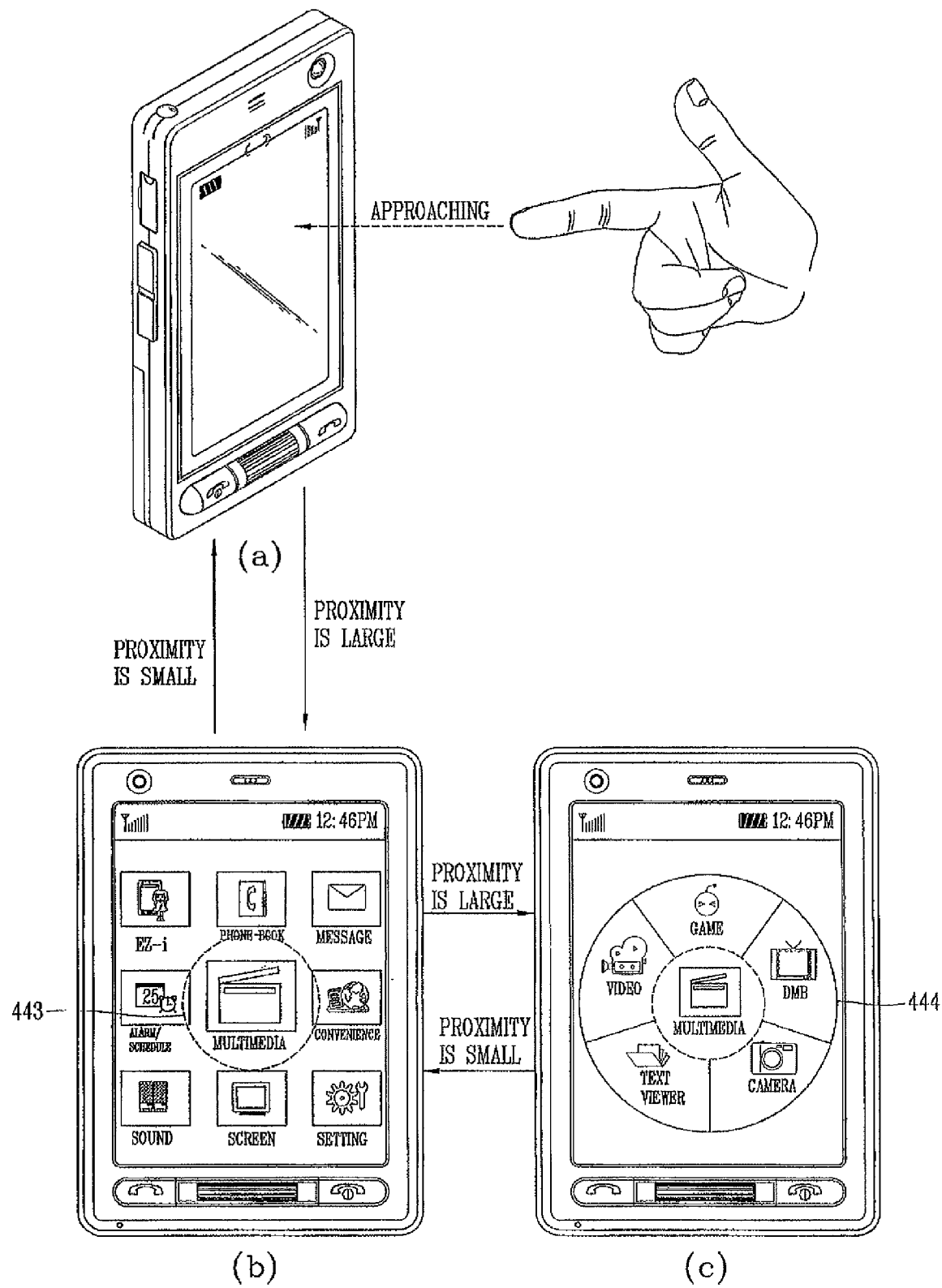
FIGS. 7(a)-(c) are overviews of display screens illustrating the selection of a particular menu in the mobile terminal according to an embodiment of the present invention.

In more detail, FIGS. 7(*a*)-(*c*) illustrate the user activating the voice recognition function by moving their finger towards the display. That is, FIG. 7(*a*) illustrates the user moving his or her finger towards the display screen at a location where a particular menu 443 is located (see FIG. 7(*b*)). As shown in FIG. 7(*c*), the controller 180 then outputs a lower level menu list 444 of the menu 443.

Accordingly, compared with the related art in which the user needs to perform multiple successive touch operations to select the lower menu, in the present invention, the lower menus can be displayed by the user's hand gesture and then the user can select one of the displayed lower menus using a single touch operation. Further, the controller 180 can sharply display the lower menu list 444 according to an access degree by adjusting the transparency of the menu list 444.

In addition, after the activated state is maintained for a certain amount of time, the controller 180 can automatically terminate the activated state. Alternatively the activated state can be maintained only while a particular key or a touch operation is performed, and when the key or touch operation is released, the activated state can be immediately terminated. In addition, if voice is not inputted for more than a certain amount of time after the activate state is started, the activated state can be automatically terminated. The controller 180 can also activate the voice recognition function or module only during the period of a video call.

Further, in the present invention, keys or menus for activating the voice recognition function are not limited to those described above, and even while an arbitrary function is being executed, the voice recognition function can be automatically activated during a particular time.

Figure 8:
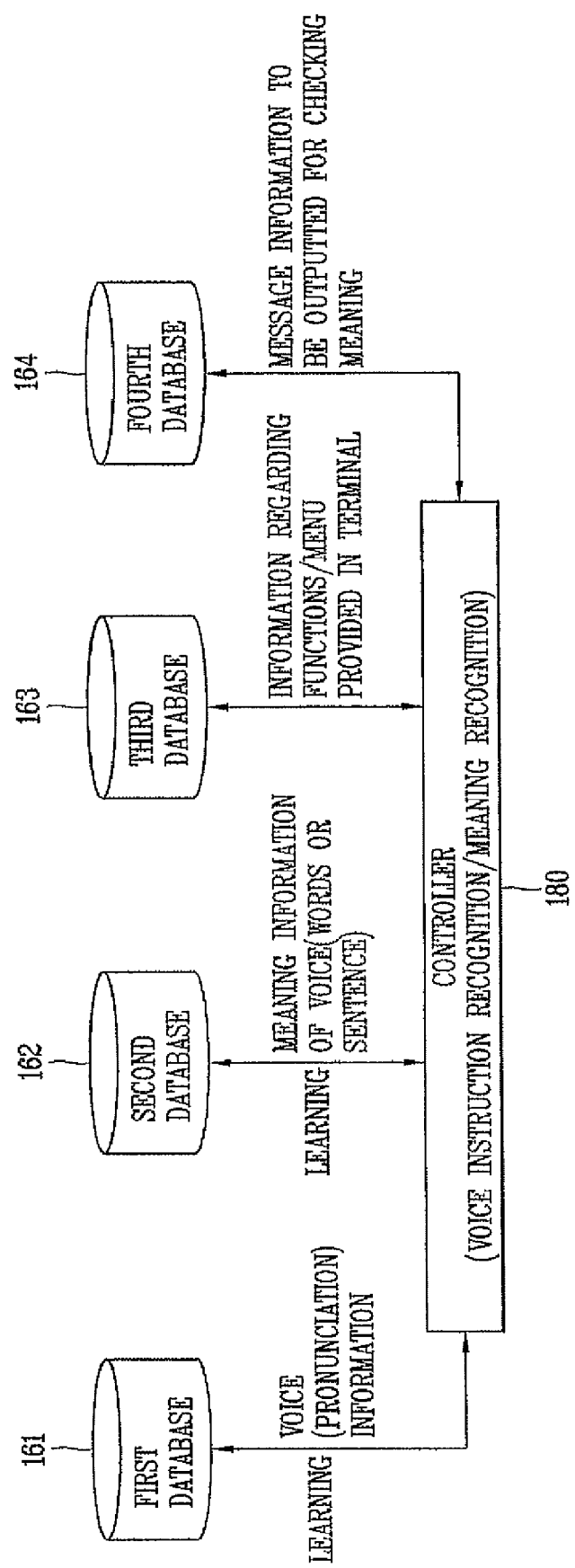
FIG. 8 is a block diagram illustrating databases used for recognizing a voice instruction of the mobile terminal according to an embodiment of the present invention.

Next, FIG. 8 is a block diagram illustrating databases the controller 180 uses for recognizing a voice instruction of the mobile terminal according to an embodiment of the present invention. That is, to recognize the voice instruction, the mobile terminal preferably includes a first database 161 that stores voice information for recognizing a voice (e.g., statement) input via a microphone in units of formants, syllables, morphemes, keywords, sentences, a second database 162 that stores information (e.g., grammar, pronunciation accuracy, sentence structure, or the like) for determining an overall meaning of a voice statement or instruction based on the recognized voice information, a third database 163 that stores a function provided in the mobile terminal, menu names, and phone book information, and a fourth database 164 that stores a message to be output from the terminal to thereby receive user confirmation on a meaning of the determined voice instruction, or voice information. A plurality of voice recognition algorithms may also be stored in the memory 160.

In addition, the controller 180 can perform an operation for determining a meaning included in a voice instruction using at least one of the plurality of databases 161 to 164, and execute a menu related to a function or a service corresponding to the determined meaning of the voice instruction. After the voice recognition function is activated, the controller 180 can activate a 'video call function' according to a voice instruction input by the user. The method of operating the video call function will now be described with reference to FIGS. 9(*a*)-(*c*).

Figure 9:
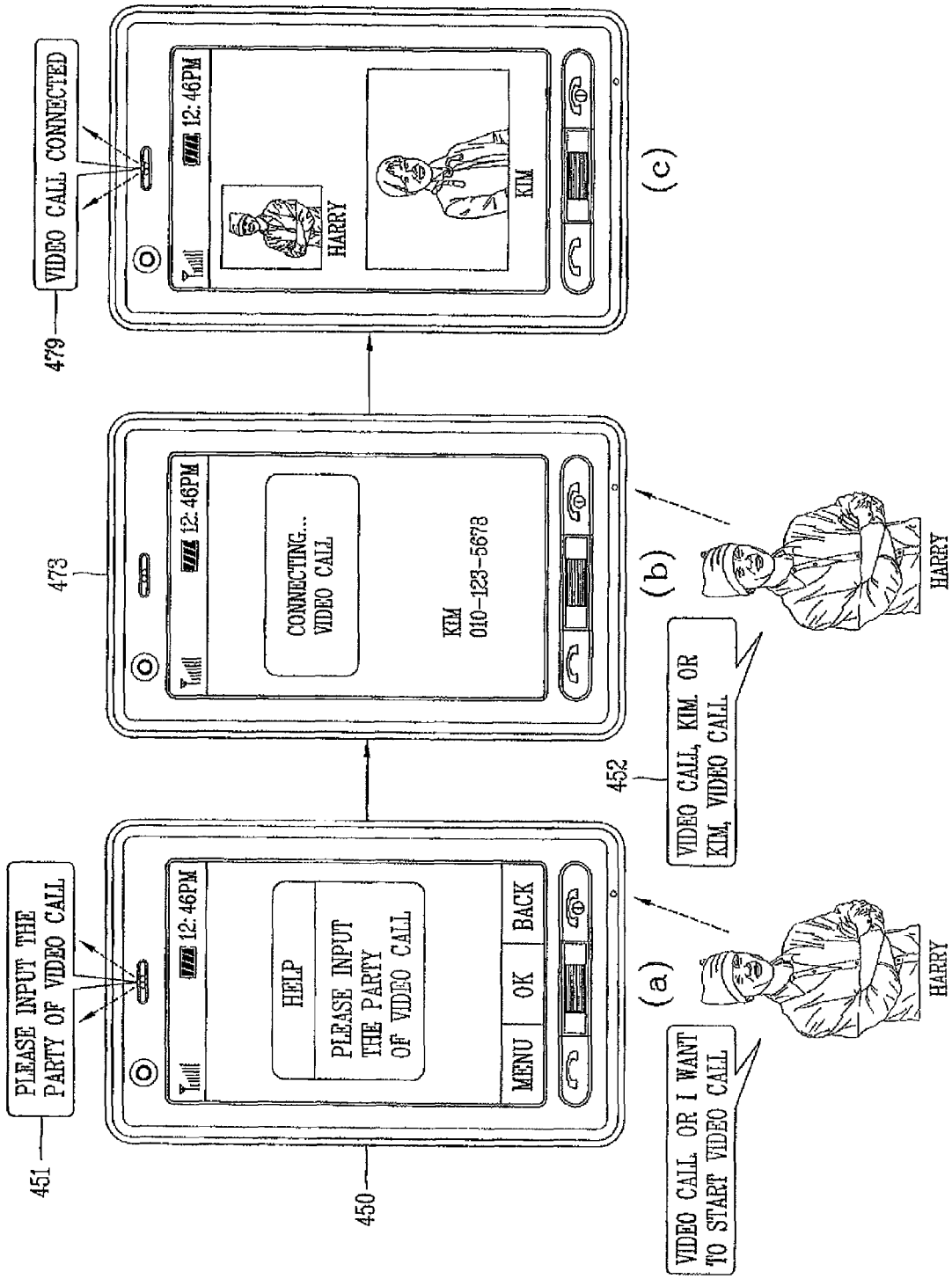
FIGS. 9(a)-(c) are overviews of display screens illustrating a method of controlling a video call using a voice instruction in the mobile terminal according to an embodiment of the present invention.

In more detail, FIGS. 9(*a*)-(*c*) are overviews of display screens illustrating a method of controlling a video call using a voice instruction in the mobile terminal according to an embodiment of the present invention. As shown in the display screen 450 in FIG. 9(*a*), the user enters a particular voice instruction (e.g., video call or I want to start a video call) related to the 'video call function', and the controller 180 recognizes the voice instruction and operates the 'video call function'.

Further, the recognition rate of the voice instruction is generally higher if the voice instruction includes information (e.g., a menu name), which precisely corresponds to a particular function or a menu, and resource consumption of the mobile terminal for recognizing the voice instruction is reduced. However, the voice instruction is not limited to the menu name, and the controller 180 can recognize a natural language voice instruction.

For example, as shown in FIG. 9(*a*), if a natural language voice instruction (e.g., 'I want to start video call') including a plurality of words is input, the controller 180 can determine the overall meaning of the natural language voice instruction based on the meaningful words (e.g., start, video, call) related to the particular function (e.g., video call). In addition, the natural language is a language that is spoken, written, etc. by humans for general-purpose communication, as distinguished from an artificial language which is artificially created.

The natural language may also be processed using a natural language processing algorithm. Further, because the natural language may or may not include an accurate name related to a particular menu, the controller 180 may not be able to recognize the voice instruction by 100 percent. Thus, according to an embodiment of the present invention, if the recognition rate of the voice recognition is a particular value or higher (e.g., 80 percent or higher), the controller 180 can determine the recognized voice recognition to be accurate.

Also, if there are a plurality of words each having such recognition rate (namely, if an input voice instruction has several meanings that have similar recognition rates so they may be interpreted in various ways), the controller 180 can display corresponding menus, and then the user can select one of the displayed to perform at least one function or menu. The recognition rate may also be set by the terminal manufacturer or can be set by the user.

In addition, whether or not a word included in the voice instruction is a meaningful word related to a particular function or menu may be determined differently depending on semantic information of grammatical information. For example, in the natural language voice instruction (e.g., 'I want to start video call'), the subject (i) or the preposition (to) may be grammatically meaningless and irrelevant to the menu.

As shown in FIG. 9(*a*), the controller can also prompt the user to enter more information using a recorded message 451. FIG. 9(*b*) illustrates the user inputting the voice instruction 452 "Video call, Kim or Kim, video call", which provides more information about the requested video call. That is, in the voice instruction 452, the name (e.g., name information registered to a phone book or a contact information such as a phone number or a mail address) designating a target is added. In addition, if a plurality of names designating the target are successively input (e.g., video call, Kim, James), the controller 180 can connect all parties to the video call operation to perform a multipoint call.

Also, as discussed above, if the name designating the target is not input and only an instruction related to a particular function is input (e.g., video call), the controller 180 can output the message 451 requesting input of the target (e.g., 'Please input the party to connect video call). Further, if the name designating the target is referred to as a first voice instruction, a voice instruction related to an operation of the particular function may be referred to as a second voice instruction, and in this instance, the first voice instruction may be combined before or after the second voice instruction. FIG. 9(*c*) illustrates the controller 180 connecting the party to the video call and notifying the user the call is being connected via an output message 479.

Also, the controller 180 may recognize the name designating the target as a single instruction by itself according to an operational state of the mobile terminal. For example, if only the first voice instruction (e.g., the name designating the other party) is input during a video call, the controller 180 can emphatically display an image of the target. This feature will now be described in detail with reference to FIGS. 10(*a*)-(*c*).

Figure 10:
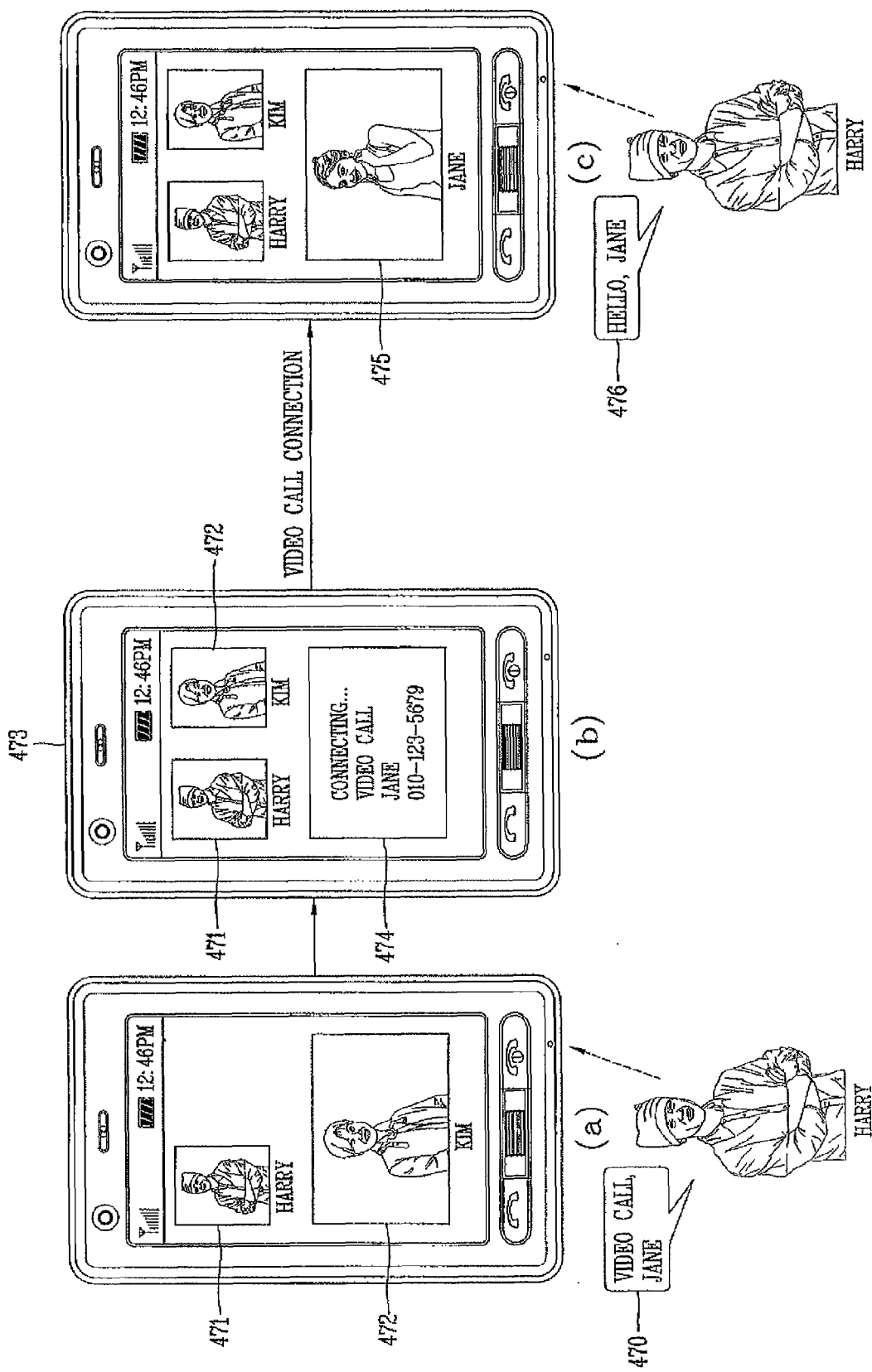
FIGS. 10(a)-(c) are overviews of display screens illustrating a method of emphasizing a video call participant in the mobile terminal according to an embodiment of the present invention.

That is, FIG. 10(*a*)-(*c*) are overviews of display screens illustrating a method of emphasizing a video call participant in the mobile terminal according to an embodiment of the present invention. As shown in FIG. 10(*a*), the user (Harry) 471 is conducting a video call with the other party Kim 472. Then, the user Harry requests another party Jane be added by inputting a voice instructions 470. The phone number of the other party Jane may be linked in the phone book or contact information with the phone number for Jane.

Further, as shown in FIG. 10(*a*), the controller 180 can emphatically display the image of the party Kim 472 by displaying her image to be larger than the image of the original caller Harry 471. As shown in FIG. 10(*b*), the controller 180 also outputs information 474 indicating the video call to Jane is being connected.

In addition, when the information 474 is being displayed, the controller 180 can advantageously shift the positions of the images of Harry 471 and Kim 472 and reduce the images such that the message 474 can be displayed in a manner that the user Harry 471 can easily view the message 474. As shown in FIG. 10(*c*), when the video call connection to the added party Jane is completed, the controller 180 can emphatically display an image 475 of Jane.

Also, even if the image 475 of the third party connected to the video call is not emphatically displayed, the controller 180 can emphatically display the image 475 when the user Harry is speaking to Jane. For example, FIG. 10(*c*) illustrates the user Harry speaking to Jane (i.e., as shown in the window 476), and then the controller 180 selectively emphatically displays the image of the party being spoken to. Thus, the images of the different parties can be emphatically displayed based on who is being spoken to at the current time. Further, the controller 180 can activate the voice instruction recognition function before receiving the voice instruction, and maintain the activated state of the voice instruction recognition function while the video call function is operating.

Figure 11:
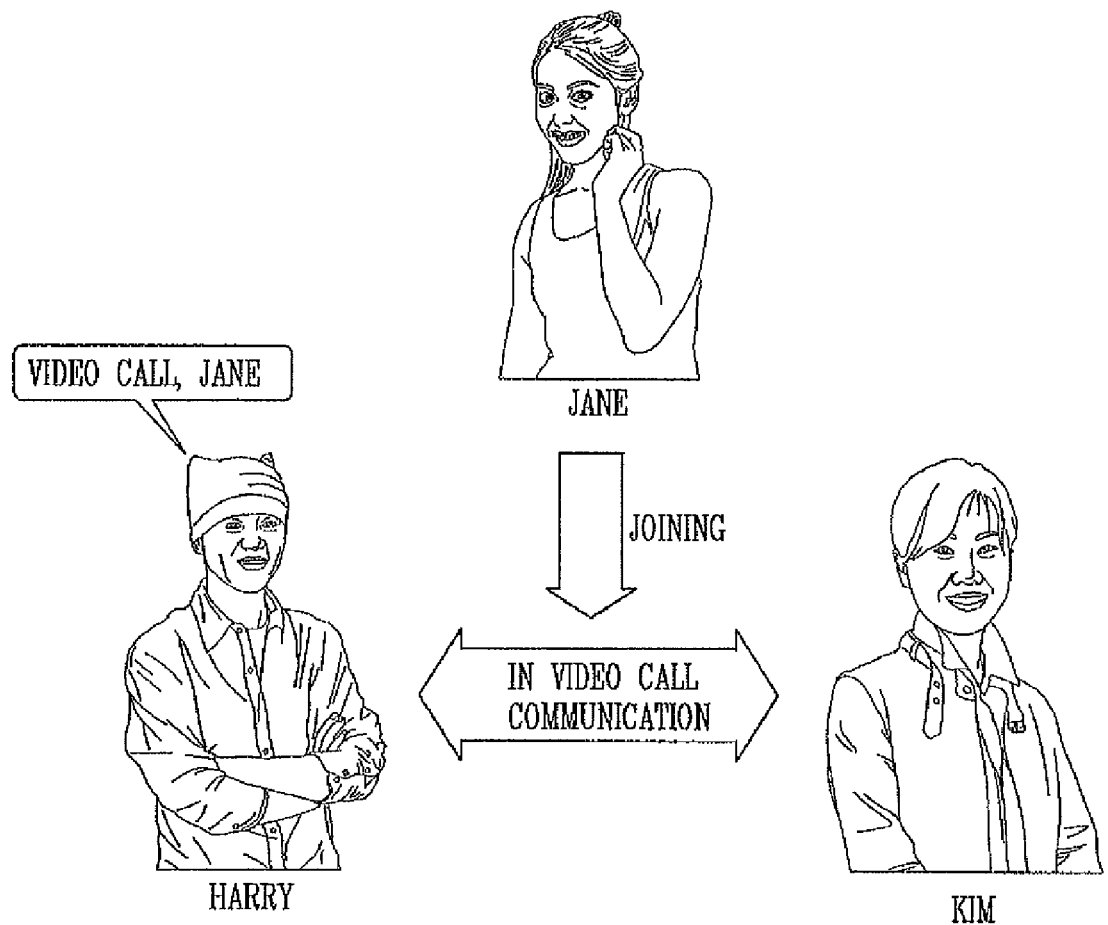
FIG. 11 is a conceptual view showing a multipoint video call method in the mobile terminal according to an embodiment of the present invention.

Thus, by repeatedly adding video call participants, the user can perform a multipoint video call. Further, as shown in FIG. 11, in the multipoint video call, all the participants may be added simultaneously when the video call function operates or during the video call.

Figure 12:
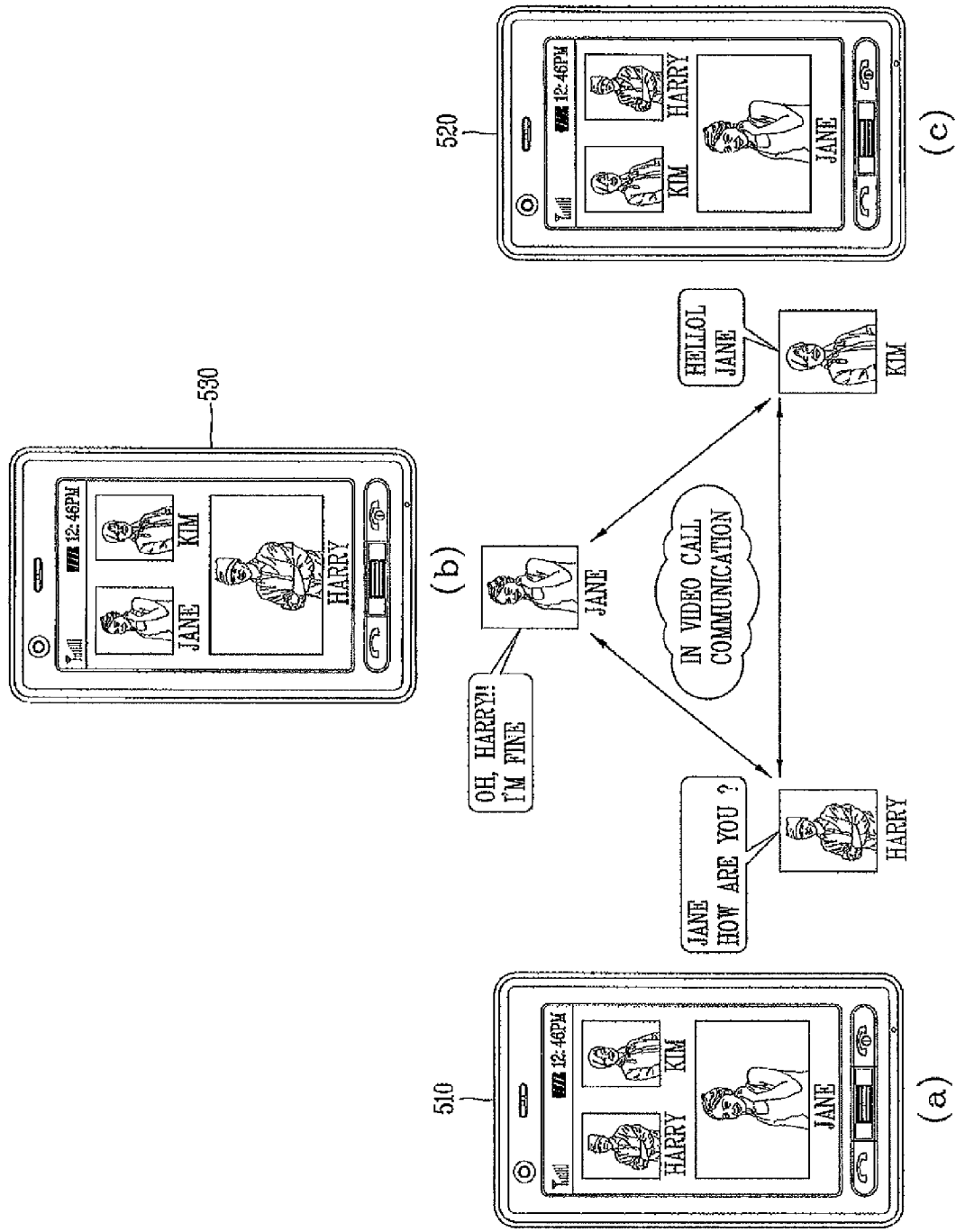
FIGS. 12(a)-(c) are overviews of display screens illustrating a method of emphatically displaying a designated party during a multipoint video call in the mobile terminal according to an embodiment of the present invention.

Next, FIGS. 12(*a*)-(*c*) are overviews of display screens illustrating a method of emphatically displaying a designated another party during a multipoint video call in the mobile terminal according to an embodiment of the present invention. As shown in FIGS. 12(*a*)-(*c*), the multipoint includes three users (e.g., Harry, Kim and Jane).

In addition, as shown in the display screens 510, 520, 530 of the mobile terminals, the person being spoken to is emphatically displayed. In more detail, the controller 180 detects the name designating the party being spoken to from a voice input by the speaking user during the video call. In this embodiment, the name designating the other party is the name of the other party (e.g., Harry, Kim, Jane). For example, as shown in the display screen 510 in FIG. 12(*a*), when the user Harry says 'Jane, How are you?' during conversation, the controller 180 detects the name Jane designating the other party from the sentence and emphatically displays the image of Jane. The controller 180 then emphatically displays the image of Jane on Harry's terminal.

As shown in the display screen 520 in FIG. 12(*b*), when the user Jane response 'Oh, Harry, I'm fine', the image of Harry is emphatically displayed on the screen of the mobile terminal of Jane. Likewise, as shown in the display screen 530 in FIG. 12(*c*), if Kim says 'Hello, Jane', the image of Jane is emphatically displayed on the screen of the mobile terminal of the user Kim. In addition, in an alternative embodiment, the controller 180 in each corresponding terminal can emphatically display the images for each person speaking rather than each person be spoken to.

Further, the method of emphasizing the different users may differ according to mobile terminals. For example, the size of the image of the other party may be increased to be emphasized, the image of the other party may be displayed in a particular color so as to be emphasized, the image of the other party may blink to be emphasized, or the image of the other party may be shifted to be closer to the center of the screen so as to be emphasized. Further, the function of emphatically displaying the image of the other party when the users input the name of the other party during the video call may be previously set by selecting an environment setting option.

Figure 13:
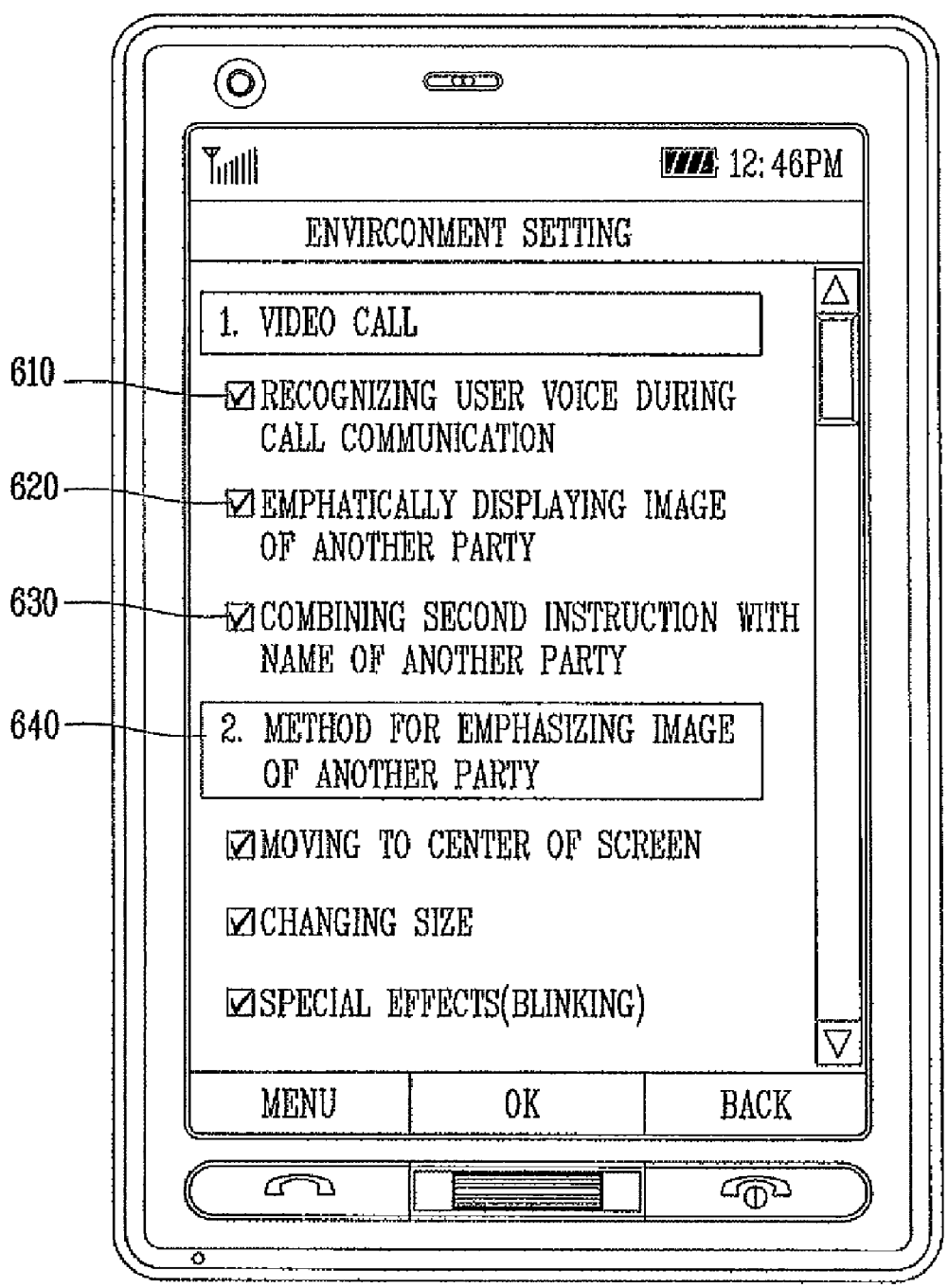
FIG. 13 is an overview of a display screen illustrating an environment setting options for emphasizing the image of another party during the video call in the mobile terminal according to an embodiment of the present invention.

For example, FIG. 13 is an overview of a display screen illustrating environment setting options for emphasizing the image of another party during the video call in the mobile terminal according to an embodiment of the present invention. As shown in FIG. 13, the environment setting options related to the video call may include an option 610 for selecting whether to discriminately recognize users conversation and instructions during the video call, an option 620 for selecting whether to emphasize an image of the other party designated by the user during the video call, an option 630 for selecting whether to detect a second instruction combined to designate the other party and execute a particular function during video call, and an option 640 for a method of emphasizing the image of the other party designated by the user when the second option 620 is selected.

In addition, the names of the respective optional items displayed on the environment setting option list may be different depending on the types of mobile terminals. Further, FIGS. 12(*a*)-(*c*) shows the method in which the controller 180 determines the name designating the other party as a voice instruction (i.e., the instruction of emphatically displaying the image) in the conversion input by the user and the image of the designated another party is emphatically displayed.

Thus, in this instance, and as shown in FIG. 13, if the option 630 for selecting whether to detect the second instruction to designate the other party and execute a particular function is selected, the controller 180 may detect the second instruction combined with an instruction or the name designating another party and execute the second voice instruction.

Further, the second voice instruction may be an instruction for adding another party to participate in the video call or an instruction for designating the other party and transmitting a file or a message during the video call. In more detail, FIG. 14(*a*)-(*c*) are overviews of display screens illustrating a method of designating another party to perform a particular function during the multipoint video call in the mobile terminal according to an embodiment of the present invention.

Figure 14:
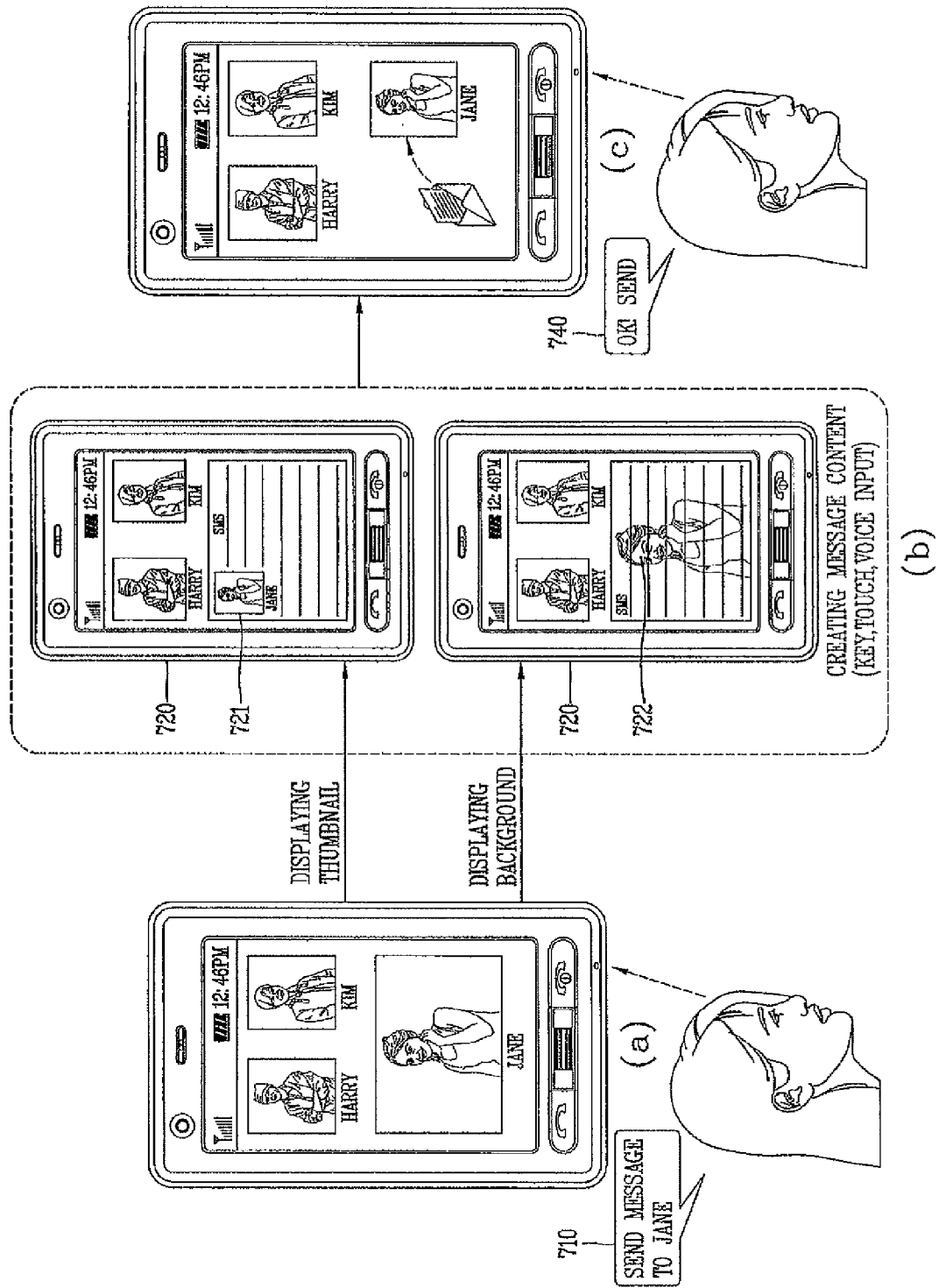
FIGS. 14(a)-(c) are overviews of display screens illustrating a method of designating another party to perform a particular function during the multipoint video call in the mobile terminal according to an embodiment of the present invention.

As shown in FIG. 14(*a*), when the user inputs a particular voice instruction (e.g., 'send message to Jane) 701 during the video call, the controller 180 detects a first instruction which is the name (e.g., Jane) designating the other party from the voice instruction and detects a second voice instruction (e.g., short message) combined before or after the name. The controller 180 then displays a screen 720 as shown in FIG. 14(*b*) for creating a short message to be sent to the designated other party (e.g., Jane) according to the detected second voice instruction. The user can then write a message in the screen 722.

Further, FIG. 14(*b*) illustrates two different type of screens 720 that the controller 180 can display for allowing the user to write and send a message to a designated party. The top portion of FIG. 14(*b*) illustrates a thumbnail picture 721 of Jane (the designated party) in an upper portion of a writing area. The lower portion of FIG. 14(*b*) illustrates a background picture 722 of Jane (the designated party) in the writing area. Thus, the user writing the message can easily determine or remember who the message is being sent to. That is, in a multiple party call, the user can easily forget who the message is supposed to be transmitted to. In this embodiment, the user can easily determine who the message is to be transmitted to because the designated party is displayed within the message area.

Further, the user can write the message in the writing area using keys, a touch input method, using voice commands, etc. Then, as shown in FIG. 14(*c*), when the user is finished writing the message, the user can input an instruction 740 instructing the controller 180 to send the message to the designated party. In the example shown in FIG. 14(*c*), the user inputs a voice instruction. Other input methods are also available.

In addition, as shown in FIG. 14(*c*), the controller 180 also advantageously displays an image or icon of a letter being transmitted to the designated party (Jane). Thus, the user can again determine that the message is being successfully transmitted to the correct party. In addition, in one example, the controller 180 changes or replaces the screen shown in FIG. 14(*b*) with images of the parties as shown in FIG. 14(*c*). As discussed above, when one of the parties is being spoken to or an instruction is designated is input corresponding to another party, the controller 180 can emphatically display their image as shown in FIG. 14(*a*).

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof. The mobile terminal may also be a mobile phone, user equipment, a smart phone, a computer, a digital broadcast terminal, a personal digital assistant, a portable multimedia player (PMP), a navigation device, and the like.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   an input unit configured to receive an instruction from a first user to perform a video call communication with at least a second user;
   a display unit;
   a voice recognition module configured to recognize input voice statements conducted during the video call communication between the first and second users; and
   a controller configured to perform the video call communication between the first and second users based on the instruction from the first user, to control the display unit to display images of the first and second users, to detect a voice statement from the first user designating the second user by examining the voice statements recognized by the voice recognition module, and to emphatically display the image of the second user compared with the image of the first user based on the detected voice statement from the first user.

2. The mobile terminal of claim 1, wherein the controller is further configured to emphatically display the image of the second user by at least one of 1) increasing a size of the displayed image of the second user, 2) shifting the displayed image of the second user to a center of a screen of the display unit, and 3) blinking or flashing the displayed image of the second user.

3. The mobile terminal of claim 1, wherein the input unit is further configured to receive the instruction from the first user to perform the video call communication with said at least the second user via at least one of 1) a voice instruction recognized by the voice recognition module, 2) a touching operation performed on a touch screen of the display unit, 3) an external sound being input through a microphone included with the mobile terminal, and 4) a hand gesture movement applied with respect to the mobile terminal and being sensed by a sensing unit of the mobile terminal.

4. The mobile terminal of claim 3, wherein the controller is further configured to control the display unit to display a plurality of menu options including a multimedia main menu option, the sensing unit is further configured to sense a hand gesture moving toward the multimedia main menu option, and the controller is further configured to display a plurality of sub menu options including an option for performing the video call communication with said at least the second user and to perform the video call communication when the option for performing the video call communication is selected.

5. The mobile terminal of claim 3, wherein when the controller can not accurately detect the voice instruction from the first user to perform the video call communication with at least the second user, the controller is further configured to output information requesting the first user to clarify the voice instruction to perform the video call communication.

6. The mobile terminal of claim 1, wherein the input unit is further configured to receive an instruction from the first user to add a third user to the video call communication, and the controller is further configured perform the video call communication with the first, second and third users and to control the display unit to display an image of the third user along with the images of the first and second users.

7. The mobile terminal of claim 6, wherein the controller is further configured to determined which one of the first, second and third users is being spoken to by examining voice statements input during the video call communication and to emphatically display the image of the determined one of the first, second and third users.

8. The mobile terminal of claim 1, wherein the controller is further configured to control the display unit to display a plurality of options the first user can select to designate how the controller is to emphatically display the image of the second user.

9. The mobile terminal of claim 1, wherein the controller is further configured to determine when the first user inputs a function instruction related to a particular function on the mobile and being designated to the second user, and to automatically perform the particular function with respect to the second user based on the input function instruction.

10. The mobile terminal of claim 9, wherein the particular function includes at least one a message transmission function and a file transmission function to the second user.

11. The mobile terminal of claim 9, wherein the controller is further configured to display the image of the second user together with the particular function designated to the second user as a thumbnail picture or a background picture with the particular function.

12. The mobile terminal of claim 1, wherein the displayed images of the first and second users include one an actual image of the first and second users and a substitute image of the first and second users.

13. The mobile terminal of claim 1, wherein the controller is further configured to activate the voice recognition module only during the video call communication and to terminate the voice recognition module at an end of the video call communication.

14. A method of controlling a mobile terminal, the method comprising:
　　receiving an instruction from a first user to perform a video call communication with at least a second user;
　　recognizing input voice statements conducted during the video call communication between the first and second users;
　　performing the video call communication between the first and second users based on the instruction from the first user;
　　displaying images of the first and second users;
　　detecting a voice statement from the first user designating the second user by examining the voice statements recognized by the voice recognition module; and
　　emphatically displaying the image of the second user compared with the image of the first user based on the detected voice statement from the first user.

15. The method of claim 14, wherein the emphatically displaying step emphatically displays the image of the second user by at least one of 1) increasing a size of the displayed image of the second user, 2) shifting the displayed image of the second user to a center of a screen of the display unit, and 3) blinking or flashing the displayed image of the second user.

16. The method of claim 14, wherein the receiving step receives the instruction from the first user to perform the video call communication with said at least the second user via at least one of 1) a voice instruction recognized by the recognizing step, 2) a touching operation performed on a touch screen of the mobile terminal, 3) an external sound being input through a microphone included with the mobile terminal, and 4) a hand gesture movement applied with respect to the mobile terminal and being sensed by a sensing unit of the mobile terminal.

17. The method of claim 16, further comprising:
　　displaying a plurality of menu options including a multimedia main menu option;
　　sensing a hand gesture moving toward the multimedia main menu option; and
　　displaying a plurality of sub menu options including an option for performing the video call communication with said at least the second user,
　　wherein the performing step performs the video call communication when the option for performing the video call communication is selected.

18. The method of claim 16, wherein when the detecting step can not accurately detect the voice instruction from the first user to perform the video call communication with at least the second user, the method further comprises outputting information requesting the first user to clarify the voice instruction to perform the video call communication.

19. The method of claim 14, wherein the receiving step further comprises receiving an instruction from the first user to add a third user to the video call communication, and
　　wherein the performing step performs the video call communication with the first, second and third users and the displaying step further comprises displaying an image of the third user along with the images of the first and second users.

20. The method of claim 19, further comprising:
determining which one of the first, second and third users is being spoken to by examining voice statements input during the video call communication,
wherein the emphatically displaying step further comprises emphatically displaying the image of the determined one of the first, second and third users.

21. The method of claim 14, further comprising:
displaying a plurality of options the first user can select to designate how the emphatically displaying step is to emphatically display the image of the second user.

22. The method of claim 14, further comprising:
determining when the first user inputs a function instruction related to a particular function on the mobile and being designated to the second user; and
automatically performing the particular function with respect to the second user based on the input function instruction.

23. The method of claim 22, wherein the particular function includes at least one a message transmission function and a file transmission function to the second user.

24. The method of claim 22, further comprising:
displaying the image of the second user together with the particular function designated to the second user as a thumbnail picture or a background picture with the particular function.

25. The method of claim 14, wherein the displayed images of the first and second users include one an actual image of the first and second users and a substitute image of the first and second users.

26. The method of claim 14, further comprising:
activating a voice recognition module included on the mobile terminal only during the video call communication and terminating the voice recognition module at an end of the video call communication.

* * * * *